April 1, 1958 — N. C. LEAPHART — 2,829,001
BRACE STRUCTURE FOR VEHICLE TAIL GATE
Filed Nov. 1, 1956 — 2 Sheets-Sheet 1
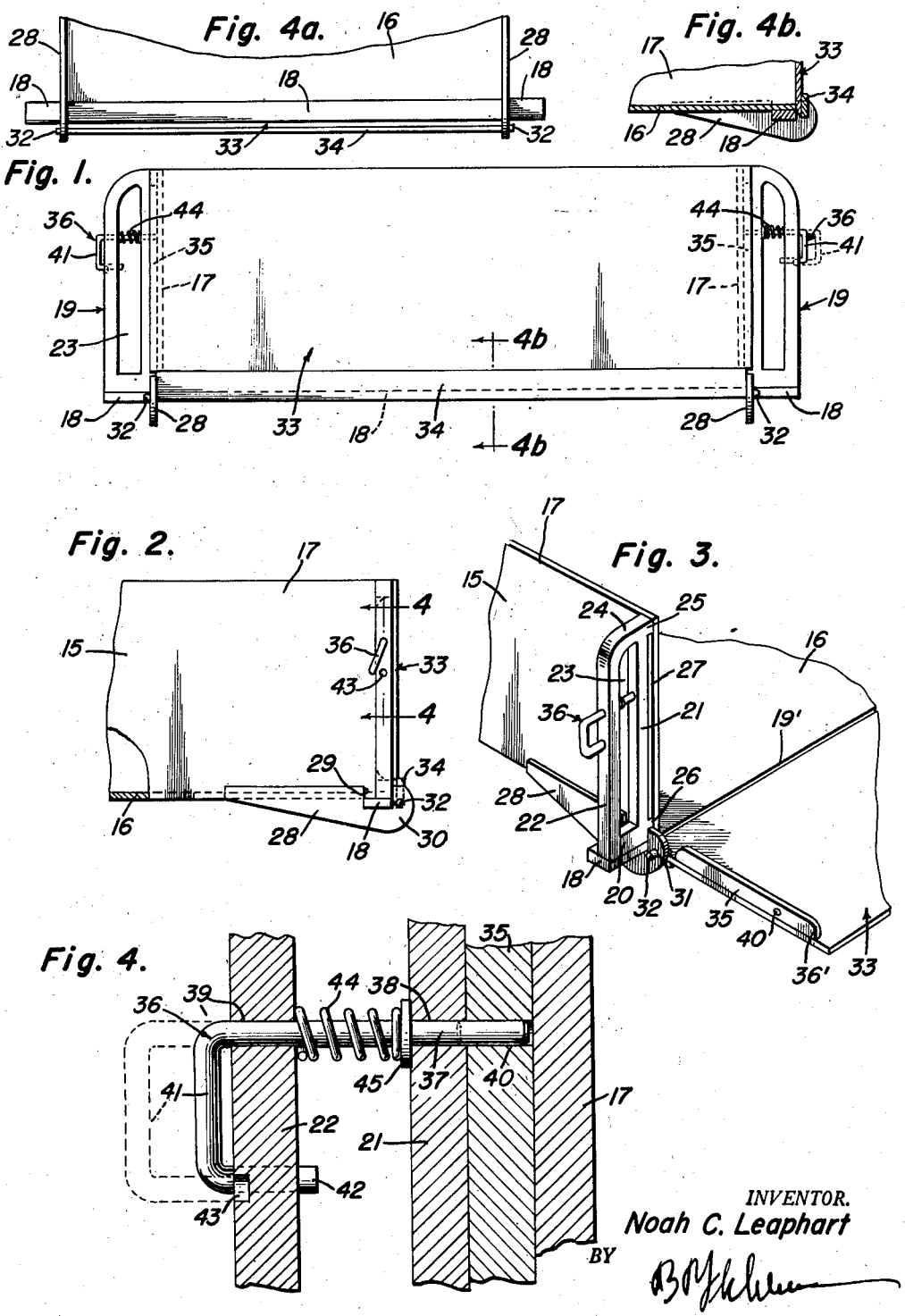
INVENTOR.
Noah C. Leaphart
BY
ATTORNEY April 1, 1958  N. C. LEAPHART  2,829,001
BRACE STRUCTURE FOR VEHICLE TAIL GATE
Filed Nov. 1, 1956  2 Sheets-Sheet 2

INVENTOR.
Noah C. Leaphart
BY
ATTORNEY

United States Patent Office 2,829,001
Patented Apr. 1, 1958

2,829,001

BRACE STRUCTURE FOR VEHICLE TAIL GATE

Noah C. Leaphart, Leesville, S. C.

Application November 1, 1956, Serial No. 619,845

2 Claims. (Cl. 296—57)

My invention relates to improvements in truck bodies and the like.

A principal object of the invention is to provide in a truck body a tail gate and bracing arrangement which will materially strengthen the body and eliminate undesirable rattling of the body and tail gate.

Another object is to provide improved locking means for the tail gate which is positive and reliable in operation, simplified, compact and extremely sturdy and durable.

A still further object is to provide bracing means for the rear end of the truck body which will carry the locking means for the tail gate and cooperate with parts of the tail gate to form a rigid boxlike construction when the tail gate is in the closed position.

Other objects and advantages of the invention will be apparent during the course of the following description.

Figure 5:
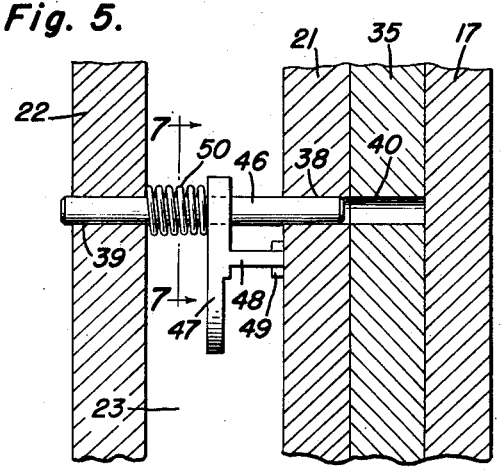
Figure 6:
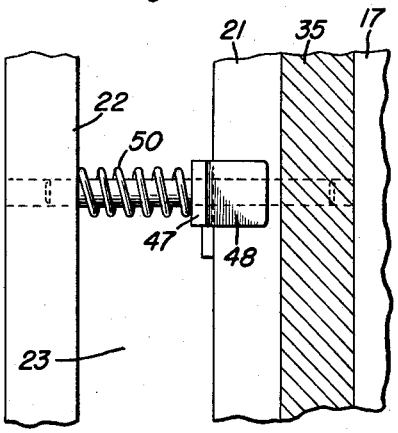
Figure 9:
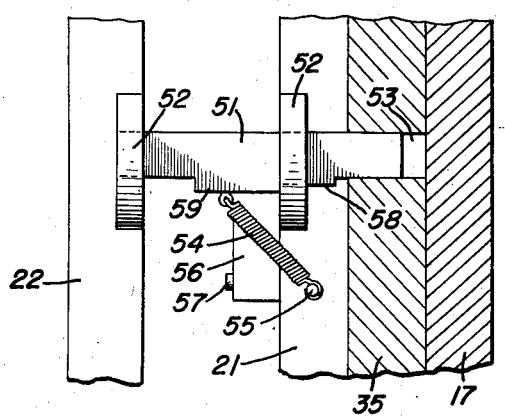
Figure 7:
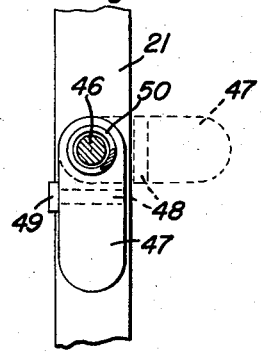
Figure 8:
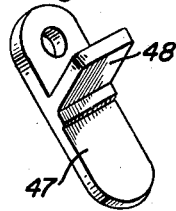
Figure 10:
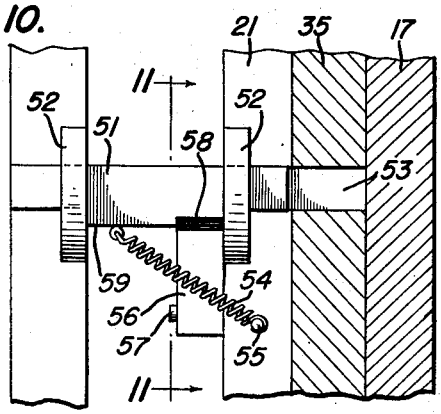
Figure 11:
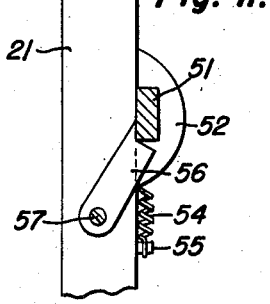

In the accompanying drawings, forming a part of this application, and in which like numerals are employed to designate like parts throughout the same, Figure 1 is a rear end elevation of a truck body and tail gate embodying the invention, Figure 2 is a fragmentary side elevation of the same, Figure 3 is an enlarged fragmentary perspective view of a rear corner portion of the truck body and showing the tail gate in an open or lowered position, Figure 4 is an enlarged fragmentary vertical section taken of line 4—4 of Figure 2, Figure 5 is a section similar to Figure 4, showing a modified form of tail gate latch, with the latch in a retracted or open position, Figure 6 is a side elevation of the latch and associated elements in Figure 5, with the latch in the closed or locking position, Figure 7 is a fragmentary vertical section taken on line 7—7 of Figure 5, Figure 8 is a perspective view of a latch operator or keeper removed, Figure 9 is a sectional view similar to Figures 4 and 5, and showing a further modified form of tail gate latch in the closed or locking position, parts in elevation, Figure 10 is a similar view showing the latch in the closed position, Figure 11 is a fragmentary vertical section taken on line 11—11 of Figure 10.

Figure 4a is a fragmentary bottom plan view of the rear portion of the truck body on a reduced scale, and, Figure 4b is a fragmentary vertical section taken on line 4b—4b of Figure 1.

In the drawings, where for the purpose of illustration are shown preferred embodiments of the invention, attention is directed first to Figures 1 to 4 inclusive, wherein the numeral 15 designates generally a truck body such as the body of a dump truck, pickup truck or the like. The body 15 may be formed of metal or other suitable material, and it includes a flat horizontal bottom 16 and upstanding vertical side walls 17, suitably rigidly secured at their lower ends to the bottom 16. The top of the truck body 15 may be entirely open, and the rear end of the body is open or unobstructed as shown in Figure 3.

A rigid transverse horizontal brace bar or plate 18 is rigidly secured to the bottom 16 by welding or the like flush with the rear transverse edge 19 of the bottom 16. The bar 18 is on the lower surface of the bottom 16 and extends for the entire width of the bottom 16 and beyond or outwardly of the side walls 17 for substantial distances, as shown.

A pair of upstanding vertical braces 19 is arranged at the rear ends of the side walls 17, with their lower ends 20 resting upon and suitably rigidly secured to the end portions of the brace bar 18. The lower ends of the braces 19 may be welded to the brace bar 18 or integral therewith if desired. The braces 19 include inner and outer spaced parallel vertical bars or portions 21 and 22 which are spaced apart to provide an opening or slot 23 in each brace 19. The lower ends of the bars 21 and 22 are preferably integrally secured to the bottom portion 20 of the brace. At their tops, the bars 21 and 22 are integrally secured to top generally horizontal portions 24 having short inwardly projecting extensions or lugs 25, suitably rigidly secured to the side walls 17 of the truck body at their upper rear corners. If desired, the bottom portions 20 of the braces 19 may also have their inner ends 26 suitably rigidly secured to the side walls 17 at their lower rear corners. The inner vertical bars 21 are spaced outwardly somewhat from the vertical side walls 17 to provide inner vertical slots or passages 27 between them and the side walls 17, and these passages extend throughout substantially the entire heights of the side walls 17 and braces 19.

Additional anchoring means for the brace bar 18 and braces 19 is provided in the form of a pair of generally horizontal elongated brackets 28, suitably rigidly secured by welding or the like to the side walls 17 near their lower ends. The elongated brackets 28 project somewhat below the horizontal bottom 16, and they extend for substantial distances forwardly of the rear end of the body 15, as shown. The brackets 28 are provided near and forwardly of their rear ends and in their top edges with rectangular notches 29, receiving the end portions of the horizontal brace bar 18 at the points where the brace bar 18 projects from beneath the bottom 16 of the truck body. The notches 29 have their open ends arranged uppermost so that they readily receive the end of the continuous transverse bar 18, which fits snugly within the notches. The elongated brackets 28 may therefore be applied in place after the bar 18 is secured to the bottom 16. The elongated brackets oppose the horizontal rearward movement of the bar 18 with respect to the wagon body, which might be caused by a heavy load in the wagon body. It is thus apparent that a simple and strong construction is provided.

Rear end portions or extensions 30 of the brackets 28 project somewhat rearwardly of the bar 18 and braces 19, as shown, and the portions 30 have aligned openings 31 extending therethrough for pivotally receiving trunnions or pins 32 of a vertically swingable end or tail gate 33 for the truck body. The trunnions 32 are preferably formed integral with a transverse brace or stiffening bar 34, arranged adjacent to the lower edge of the tail gate 33 and rigidly secured to the outer surface of the same by any suitable means. The tail gate 33 is rectangular, and of a proper size or height to form a complete closure for the open rear end of the body 15. The tail gate is freely swingable vertically about the axes of the trunnions 32 from open to closed or elevated positions.

The tail gate 33 is provided upon its forward side and adjacent its ends with a pair of elongated rigid flanges or tongues 35, rigidly secured thereto by welding or the like and extending for the major portion of the height of the tail gate. The ends of the tongues 35 are preferably rounded as at 36'. The tongues 35 are arranged in alignment with the inner slots 27 between the side walls 17 and inner bars 21 of the braces 19, so that when the tail gate is swung to the upright or closed position the tongues 35 will enter the slots 27 and preferably have a snug or wedging engagement therein, the tongues 35 extending throughout the major portion of the lengths of the slots 27.

Means are provided to releasably latch the tail gate in the closed upstanding position, including a pair of generally L-shaped bolts 36 having transversely extending portions or pins 37 slidable within aligned openings in the bars 21 and 22, as indicated at 38 and 39 respectively, Figure 4. The pins 37 also have their inner ends received within openings 40, formed in the tongues 35 at the proper points for registration with the openings 38 when the tail gate is in the closed or upstanding position. The bolts 36 further comprise outer transverse arms or extensions 41, integral with the pins 37 and extending at right angles thereto, and these arms 41 lie outwardly of the bars 22. The free ends of the arms 41 are directed inwardly for forming relatively short extensions 42, integral therewith and parallel with the portions or pins 37. The bars 22 have recesses 43 formed in their outer sides and below the openings 39 to receive the inwardly directed extensions 42 when desired. Expansible coil springs 44 surround the pins 37 between the outer bars 22, and collars or washers 45 which are fixed upon the pins 37, outwardly of the bars 21. The springs 44 thus serve to bias the bolts 36 inwardly toward engagement with the openings 40 of the tongues 35.

When the tail gate 33 is to be opened, the extensions 41 of bolts 36 are grasped and the pins 37 are withdrawn from the openings 40, against the action of springs 44. The extensions 42 are now disposed outwardly of the vertical bars 22, and may have their inner ends engaged in the recesses 43 for locking the bolts 36 in the outer or retracted positions, as shown in broken lines in Figure 4. When the tail gate is closed, the tongues 35 enter the slots 27 and the openings 40 register with the openings 38. The extensions 42 are now disengaged from the recesses 43, and the bolts 36 are turned upon the axes of pins 37 until the extensions 42 pass clear of the bars 22, at either the forward or rear sides of the same. The springs 44 will now urge the pins 37 into locking engagement with the openings 40, and the tail gate 33 will be securely locked in the elevated or closed position.

With the above construction, the tail gate will be effectively prevented from rattling while closed, and the closed tail gate will materially strengthen the truck body 15, due to the wedging engagement of the tongues 35 in the slots 27. In addition, the braces 19 and the bar 18 will render the open rear end of the truck body very rigid and strong, so that the truck body will be prevented from breaking at the lower rear corners and the sides 17 will be prevented from spreading apart at their tops. These difficulties are frequently encountered in conventional truck bodies not equipped with my bracing means and tail gate.

In Figures 5 to 8 inclusive, I have shown a modified form of latching means for the tail gate, including a straight pin or bolt 46, slidably mounted within the openings 38 and 39 of the vertical bars 21 and 22. The bolt 46 is adapted to enter the opening 40 of the tongue 35 for locking the tail gate 33 in the closed position, as previously described. As shown in the drawings, the bolt 46 has an operating arm 47 rigidly secured thereto within the slot or opening 23 between the bars 21 and 22. The operating arm 47 carries an inwardly directed lug 48, integral therewith which may engage the outer side of the bar 21 when the bolt 46 is pulled outwardly or retracted from engagement with the opening 40. The operating arm 47 now serves to releasably lock the bolt 46 in the retracted position, so that the tail gate 33 may be lowered.

A stop 49 is rigidly secured to the outer face of each bar 21 to be engaged by the lug 48, when the operating arm 48 and bolt are drawn outwardly and passed over the outer side of the bar 21. When it is desired to lock the tail gate in the closed position, the arm 47 is merely turned upon the axis of the bolt 46, until the lug 48 clears either the forward or rear side of the vertical bar 21, to permit the expansible coil spring 50 which surrounds the bolt 46 between the arm 47 and bar 22 to urge the bolt 46 back into the opening 40. When this occurs, the inner side of the arm 47 will engage the outer side of the bar 21 and the lug 48 will overlie either the forward or rear side of the bar 21, as shown in Figure 6. All other parts are identical with those shown and described in connection with the first form of the invention.

In Figures 9 to 11 I have shown a further modification of the latching means for the tail gate 33. Such means comprises a slidable bolt 51, held within suitable guides 52, rigidly secured to the rear sides of the bars 21 and 22. The inner end of the bolt 51 is engageable within a suitable opening 53 formed in the tail gate tongue 35. The bolt 51 is rectangular in cross section, as are the openings in the guides 52 and the opening 53, so that the bolt cannot turn upon its longitudinal axis. The bolt 51 is biased into engagement with the opening 53 by a retractile coil spring 54, having one end secured to the bolt and its opposite end secured to a pin 55 or the like in the rear side of the vertical bar 21. A vertically swingable keeper 56 is pivoted at 57 to the inner face of the bar 21, beneath the bolt 51. When the bolt 51 is retracted to its outer position free of the opening 53, Figure 10, the keeper 56 is engageable within a notch or recess 58 formed in the lower side of 51 inwardly of a bottom projection or shoulder 59 of the bolt. When the keeper 56 is pivoted to release the bolt 51 for engagement within the opening 53, the inner end of the projection 59 will engage the inner guide 52, Figure 9, to limit inward movement of the bolt. Outward movement of the bolt, Figure 10, is limited by engagement of the projection 59 with the outer guide 52. All other parts are identical with those shown and described in connection with the first form of the invention.

It is to be understood that the forms of the invention herewith shown and described are to be taken as preferred examples of the same, and that various changes in the shape, size and arrangement of parts may be resorted to, without departing from the spirit of the invention or the scope of the subjoined claims.

Having thus described my invention, I claim:

1. The combination with a wagon body including substantially vertical sides and a substantially horizontal bottom, a continuous rigid bar arranged beneath the bottom adjacent to its rear end and rigidly secured to said bottom, the ends of said continuous bar extending outwardly beyond said sides, substantially vertical braces disposed outwardly of said sides and engaging therewith and having their lower ends disposed above and rigidly secured to the ends of said continuous bar which project beyond said sides, substantially horizontal elongated brackets disposed outwardly of said sides and adjacent to said bottom and rigidly secured to said sides, each elongated bracket being provided near its rear end with a notch having its open end arranged uppermost, said notch snugly receiving the adjacent projected end of said bar and opposing the rearward horizontal movement of said bar, each elongated bracket extending rearwardly beyond said adjacent substantially vertical brace and provided at a point spaced from said brace with an opening, a tail gate, a pivot element carried by the tail gate near each end thereof and pivotally mounted within the opening of the adjacent elongated bracket, and means to hold the tail gate in the closed position.

2. The combination with a wagon body including substantially vertical sides and a bottom extending between the sides, of a continuous reinforcing bar arranged beneath the bottom adjacent to its rear end and secured to said bottom, the ends of said bar extending outwardly beyond said sides, substantially vertical braces disposed outwardly of said sides and engaging therewith and having their lower ends mounted upon and secured to the outwardly projecting ends of said bar, said braces forming with said sides upstanding slots, substantially horizontal elongated brackets disposed adjacent to said sides and secured to the wagon body, each elongated bracket being provided with an opening to receive the adjacent end of said bar, each elongated bracket extending rearwardly beyond the adjacent substantially vertical brace, a tail gate, means to pivotally mount the tail gate upon the rear ends of the elongated brackets, a tongue secured to the tail gate adjacent to each end thereof and arranged to be moved into said slot when the tail gate is shifted to the inner position, and a latch element mounted upon each brace for detachable engagement with the adjacent tongue.

References Cited in the file of this patent

UNITED STATES PATENTS 472,523    Chain ................ Apr. 12, 1892